May 9, 1950 P. J. HUBER 2,506,924
FINE ADJUSTMENT DEVICE FOR DIAL INDICATORS
Filed Oct. 8, 1945
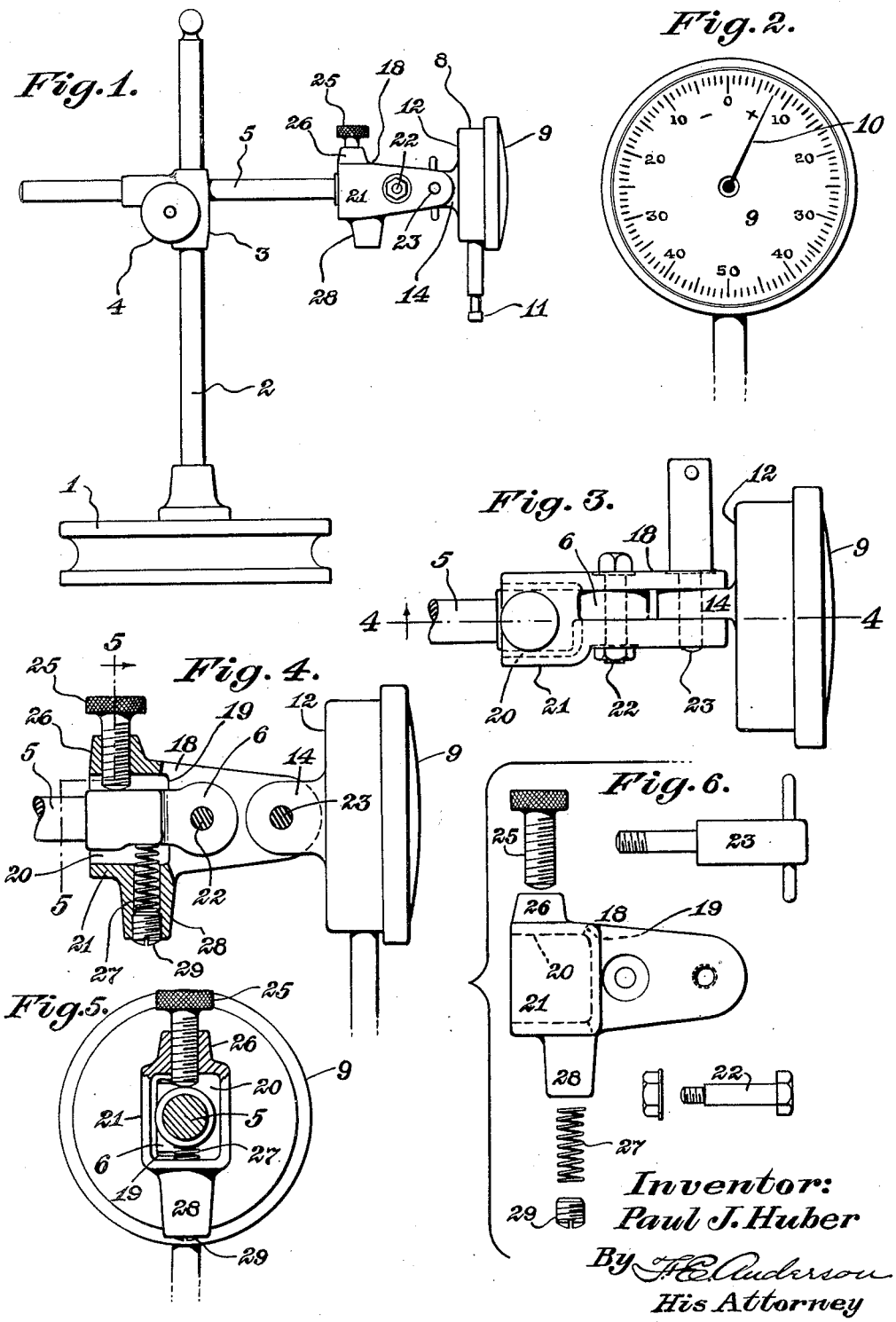
Inventor:
Paul J. Huber
By H. E. Anderson
His Attorney Patented May 9, 1950

2,506,924

UNITED STATES PATENT OFFICE 2,506,924

FINE ADJUSTMENT DEVICE FOR DIAL INDICATORS

Paul J. Huber, West Hartford, Conn.

Application October 8, 1945, Serial No. 620,857

1 Claim. (Cl. 33—172)

This invention relates to gauges of the type well known as test indicators. Such instruments are extensively employed in the production of precision parts which are measured for their comparison with a required standard. Readings upon a gauge of this character are indicated by the position of a pointer which is actuated to traverse a dial by a movable feeler, the latter being adapted for suitable contact with pieces to be measured. The instrument includes means for permitting adjustment of certain parts so that a standard measurement for comparison may be indicated by zero on the gauge dial. Then when the gauge is applied to pieces to be tested for variation from standard the pointer will move to the plus side of zero when said pieces are oversize and to the minus side of zero when the pieces are under size. The matter of setting a gauge to a standard to give a reading of zero is a delicate operation requiring fine adjustment similar to the screw adjustment provided for in a micrometer. Test indicator gauges as now commonly manufactured include in their mechanism some form of screw adjustment for establishing a zero setting but many fine and costly instruments acquired years ago still are capable of rendering valuable service although they lack the fine screw adjustment found in gauges of recent design. Because of this lack the matter of setting one of the older instruments consumes time involving more or less tapping of the dial supporting arm to move it up or down just the exact amount required. It therefore is the object of the present invention to provide means for effecting fine screw adjustment available as an adjunct to test indicators which lack such means. The invention consists of the few simple parts fully set forth in the following detailed description together with the manner of associating these parts with a gauge of standard manufacture all as illustrated in the accompanying drawings while the novelty of the invention is defined in the appended claim.

In the drawings,

Figure 1 is a side view of a test indicator gauge embodying my invention.

Figure 2 is a front view of a dial shown in Fig. 1.

Figure 3 is a detail top view of parts shown in Fig. 1.

Figure 4 is a sectional view on line 4—4 of Fig. 3.

Figure 5 is a sectional view on line 5—5 of Fig. 4, and,

Figure 6 is a detail view of parts forming the adjunct comprising my invention.

Referring to the drawing parts of a dial test indicator of extensively used design may be briefly described as including base 1, upright standard 2, a fitting 3 movable on the standard and adapted to be clamped thereto together with an arm by screw 4, said arm 5 having at one end an ear 6 for receiving a fulcrum pin for a purpose that will presently appear. An indicator 8 has the usual dial 9 and pointer 10, the latter being operable by feeler 11 about an axis coincident with the longitudinal axis of the body of the indicator, or in other words, the axis about which the indicating pointer turns. Thus the general arrangement of the indicator instrument is not noticeably changed by addition thereto of my improved micrometer means of adjustment. If the pre-conversion arrangement and appearances of the instrument were appreciably altered this would tend to confuse an operator familiar with the type of instrument to which the fine adjustment means is applicable. From the rear of dial casing 12 is extended a fulcrum pin receiving ear 14 which normally mates ear 6, that is to say when the instrument is without the adjunct which is the essential feature of the present invention. When thus mated the ears 6 and 14 are of course held together by a suitable fulcrum pin (not shown) which is threaded into one of the ears and shouldered against the other so that the two ears may be frictionally clamped together in a manner to permit angular adjustment of the dial.

The adjusting means of my invention include a screw and spring associated with an intermediate element 18 which is suitably formed for pivotal attachment at separate points respectively to ears 6 and 14. For engagement with said ears element 18 which is substantially straight and somewhat elongated is slotted at one end as at 19 to form a yoke and for a purpose to be explained the opposite end of element 18 is recessed at 20 to form a hollow hub 21 for surrounding arm 5 adjacent to ear 6. The recess in hub 21 and the yoke forming slot 19 intersect so that ear 6 of arm 5 may be passed through said hub into position between arms of the yoke. Ears 6 and 14 are attached to the yoke of element 18 respectively by bolt 22 and screw stud 23 both of which are adjustable to provide for suitable frictional engagement of said ears between arms of the yoke. It will be clear that movement of dial supporting yoke 18 about the fulcrum provided by bolt 22 serves for locating feeler 11 for any change in its position up or down that may be required to move pointer 10 to zero. For controlling such movement hub 21 carries a screw 25 threaded in boss 26 and a spring 27 seated in boss 28 against screw 29, said screw and spring being arranged to bear respectively on opposite sides of arm 5 adjacent the base of ear 6. Spring 27 tends to move yoke 18 in a direction serving to keep screw 25 firmly in contact with arm 5 and by manipulation of said screw desired adjustment of the yoke together with dial 9 and feeler 11 may be readily obtained. That is if screw 25 is turned in one direction the indicator will be raised and if turned in the opposite direction the indicator will be lowered. The range of adjustment thus attainable need not be a matter of more than a few thousandths of an inch, therefore the longitudinal axis of the yoke 18 is always in substantial alignment with the longitudinal axis of supporting arm 5. Also of the adjustment permitted by the joint between dial indicator 8 and yoke 18 only a slight range is required. Therefore the longitudinal axis of supporting arm 5, the longitudinal or pointer axis of the body of dial indicator 8, and the longitudinal axis of yoke 18 are always substantially coincident and these few parts with their transverse pivotal connections and adjusting screw 25 present a structure whose manner of adjustment is directly obvious. In Fig. 6 are shown in unassembled relation the several simple parts for converting a test indicator of the type lacking to one having provision for fine screw adjustment. It is believed that the advantages and manner of operating an instrument converted to the purpose of my invention will be fully understood from the foregoing description.

Having thus described my invention, what I claim is:

A test indicator gauge including in combination, a supporting arm terminating in a pivotal ear, a dial indicator having a pivotal ear extended therefrom, a substantially straight elongated intermediate member having a slot at one end and a recess at the other, said slot intersecting the recess to form a yoke having a hollow hub, pivotal means extending transversely of the yoke for securing the ear of the supporting arm between arms of the yoke with said supporting arm extending through the hub of the yoke, a spring carried by the hub of the yoke and bearing against one side of the supporting arm, a screw carried by the yoke and bearing against the opposite side of said arm, and pivotal means extending transversely of the yoke for securing the ear of the dial between arms of the yoke, the longitudinal axes of the supporting arm, the body of the dial indicator and the yoke being substantially coincident.

PAUL J. HUBER.

REFERENCES CITED

The following references are of record in the file of this patent:

UNITED STATES PATENTS

| Number | Name | Date |
|---|---|---|
| 39,404 | Jennings | Aug. 4, 1863 |
| 402,763 | Norcross | May 7, 1889 |
| 715,582 | Jacobs et al. | Dec. 9, 1902 |
| 1,341,935 | Schustarich | June 1, 1920 |
| 1,380,580 | Nell | June 7, 1921 |
| 2,287,890 | Legassey | June 30, 1942 |

FOREIGN PATENTS

| Number | Country | Date |
|---|---|---|
| 552,840 | Great Britain | Apr. 27, 1943 |
| 693,806 | France | Nov. 15, 1930 |